United States Patent
Jang et al.

(10) Patent No.: US 11,503,558 B2
(45) Date of Patent: *Nov. 15, 2022

(54) METHOD AND APPARATUS FOR TIME SYNCHRONIZATION IN DEVICE-TO-DEVICE COMMUNICATION

(71) Applicant: Samsung Electronics Co., Ltd., Suwon-si (KR)

(72) Inventors: Jaehyuk Jang, Suwon-si (KR); Kyeongin Jeong, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 107 days.

This patent is subject to a terminal disclaimer.

(21) Appl. No.: 16/912,121

(22) Filed: Jun. 25, 2020

(65) Prior Publication Data

US 2020/0329448 A1 Oct. 15, 2020

Related U.S. Application Data

(63) Continuation of application No. 16/126,335, filed on Sep. 10, 2018, now Pat. No. 10,736,065, which is a
(Continued)

(30) Foreign Application Priority Data

Jul. 31, 2013 (KR) ........................ 10-2013-0091114

(51) Int. Cl.
*H04W 56/00* (2009.01)
*H04W 76/14* (2018.01)

(52) U.S. Cl.
CPC ... *H04W 56/0025* (2013.01); *H04W 56/0015* (2013.01); *H04W 76/14* (2018.02)

(58) Field of Classification Search
CPC ............. H04W 56/0025; H04W 76/14; H04W 56/0015; H04W 4/70; H04W 56/001
See application file for complete search history.

(56) References Cited

U.S. PATENT DOCUMENTS 6,751,248 B1 6/2004 Tan
10,075,932 B2 * 9/2018 Jang .................. H04W 56/0015
(Continued)

FOREIGN PATENT DOCUMENTS

CN 101288276 A 10/2008
CN 103036826 A 4/2013
(Continued)

OTHER PUBLICATIONS

Xu et al.; Device-to-Device Communication as an Underlay in Coordinated Heterogenous Cellular Network; Telecommunication Science; Direct Terminal Communication Technology in Collaborative Heterogeneous Cellular Overlay Network; Jun. 2013; China.
(Continued)

*Primary Examiner* — Steven H Nguyen
(74) *Attorney, Agent, or Firm* — Jefferson IP Law, LLP

(57) ABSTRACT

A method for matching time synchronization between UEs during Device-to-Device (hereinafter referred to as "D2D") communication in a radio communication system without involving an Evolved Node B (ENB) is proposed. Using the proposed method, all the UEs can operate to match the time synchronization without malfunction in accordance with a synchronization signal of the ENB even if the UE inside an ENB area and the UE outside the ENB area coexist.

12 Claims, 7 Drawing Sheets

Related U.S. Application Data continuation of application No. 14/908,061, filed as application No. PCT/KR2014/007006 on Jul. 30, 2014, now Pat. No. 10,075,932.

(56) References Cited

U.S. PATENT DOCUMENTS

| | | | |
|---|---|---|---|
| 10,736,065 B2 * | 8/2020 | Jang | H04W 56/0025 |
| 2004/0063451 A1 | 4/2004 | Bonta et al. | |
| 2006/0120338 A1 | 6/2006 | Hwang et al. | |
| 2007/0086426 A1 * | 4/2007 | Bonta | H04W 48/10 |
| | | | 370/350 |
| 2007/0201423 A1 | 8/2007 | Laroia et al. | |
| 2009/0040985 A1 | 2/2009 | Barnawi et al. | |
| 2009/0213760 A1 | 8/2009 | Shin et al. | |
| 2010/0226345 A1 | 9/2010 | Qu et al. | |
| 2011/0170431 A1 | 7/2011 | Palanki et al. | |
| 2011/0182280 A1 | 7/2011 | Charbit et al. | |
| 2012/0115518 A1 | 5/2012 | Zeira et al. | |
| 2013/0089010 A1 | 4/2013 | Richardson et al. | |
| 2013/0089023 A1 | 4/2013 | Shin et al. | |
| 2013/0108000 A1 | 5/2013 | Park et al. | |
| 2013/0178221 A1 | 7/2013 | Jung et al. | |
| 2013/0183905 A1 | 7/2013 | Richardson et al. | |
| 2013/0203424 A1 | 8/2013 | Van Phan et al. | |
| 2013/0250771 A1 | 9/2013 | Yu et al. | |
| 2013/0324114 A1 | 12/2013 | Raghothaman et al. | |
| 2013/0336307 A1 | 12/2013 | Park et al. | |
| 2014/0112194 A1 | 4/2014 | Novlan et al. | |
| 2014/0171062 A1 | 6/2014 | Fallgren et al. | |
| 2014/0314057 A1 | 10/2014 | Van Phan et al. | |
| 2014/0335853 A1 * | 11/2014 | Sartori | H04W 76/14 |
| | | | 455/552.1 |
| 2015/0208453 A1 | 7/2015 | Yamazaki et al. | |
| 2015/0271856 A1 | 9/2015 | Tong et al. | |
| 2015/0319724 A1 * | 11/2015 | Chae | H04W 56/0025 |
| | | | 370/315 |
| 2016/0157273 A1 | 6/2016 | Ljung | |
| 2016/0174130 A1 | 6/2016 | Ljung et al. | |
| 2016/0234670 A1 * | 8/2016 | Zhang | H04W 56/001 |

FOREIGN PATENT DOCUMENTS

| | | |
|---|---|---|
| CN | 103108389 A | 5/2013 |
| EP | 2 587 845 A1 | 5/2013 |
| GB | 2491114 A | 11/2012 |
| KR | 10-2015-0010434 A | 1/2015 |
| WO | 2007/082253 A1 | 7/2007 |
| WO | 2013/077684 A1 | 5/2013 |
| WO | 2013/083197 A1 | 6/2013 |
| WO | 2013/091229 A1 | 6/2013 |
| WO | 2013/104084 A1 | 7/2013 |

OTHER PUBLICATIONS

Fujitsu; Discussion on D2D discovery; 3GPP TSG-RAN1 #73; R1-131933; May 20-24, 2013; Fukuoka, Japan.

Renesas Mobile Europe Ltd; ProSe direct communication (D2D); 3GPP TSG-RAN WG1 Meeting #73 R1-132174; May 20-24, 2013; Fukuoka, Japan.

Etri; Discovery signal design based on legacy signals; 3GPP TSG RAN WG1 Meeting #73; R1-132559; May 20-24, 2013; Fukuoka, Japan.

Institute for Information Industry (III); Evaluations of D2D Discovery Schemes; 3GPP TSG RAN WG1 Meeting #73; R1-132541; May 20-24, 2013; Fukuoka, Japan.

Chinese Office Action with English translation dated Jul. 27, 2021; Chinese Appln. No. 202010046015.7.

Ericsson et al.; Synchronization Procedures for D2D Discovery and Communication; 3GPP TSG-RAN WG1 #73 R1-132029; May 20-24, 2013; Fukuoka, Japan.

Alcatel-Lucent Shanghai Bell et al.; Discussion of D2D discovery methods; 3GPP TSG RAN WG1 Meeting #73; R1-132068; May 20-24, 2013; Fukuoka, Japan.

Etri; ProSe Communications for Outside Network Coverage; 3GPP TSG-RAN1 Meeting #73; R1-132557; May 20-24, 2013; Fukuoka, Japan.

ZTE; Discussions on LTE Device to Device Communication; 3GPP TSG-RAN WG1 Meeting #73; R1-132115; May 20-24, 2013; Fukuoka, Japan.

Indian Office Action dated Feb. 21, 2020; Indian Appln. No. 201627003119.

* cited by examiner

METHOD AND APPARATUS FOR TIME SYNCHRONIZATION IN DEVICE-TO-DEVICE COMMUNICATION

CROSS-REFERENCE TO RELATED APPLICATION(S)

This application is a continuation application of prior application Ser. No. 16/126,335, filed on Sep. 10, 2018, which is a continuation application of prior application Ser. No. 14/908,061, filed on Jan. 27, 2016, which issued as U.S. Pat. No. 10,075,932 on Sep. 11, 2018, which was the National Stage of International application PCT/KR2014/007006 filed on Jul. 30, 2014, which claimed priority under 35 U.S.C § 119(a) of a Korean patent application number 10-2013-0091114, filed on Jul. 31, 2013, in the Korean Intellectual Property Office, the disclosure of each of which is incorporated by reference herein in its entirety.

TECHNICAL FIELD

The present invention relates generally to a radio communication system, and more particularly, to a method for matching time synchronization between devices during Device-To-Device (hereinafter referred to as "D2D") communication in the 3rd Generation Partnership Project (3GPP) system (e.g., Long Term Evolution (LTE) system).

BACKGROUND ART

In general, a mobile communication system was developed for the purpose of providing a voice service while securing user's mobility. However, the area of the mobile communication system has been expanded gradually to data services in addition to voice services; and, at present, the mobile communication system has been developed to the extent of being capable of providing high-speed data services. However, since resources are insufficient in the mobile communication system that is currently providing services and users demand higher-speed services, there is a need for a greatly developed mobile communication system.

To cope with such a need, standardization of a Long Term Evolution (LTE) system in the $3^{rd}$ Generation Partnership Project (3GPP) is currently underway as one of the next-generation of mobile communication systems that are being developed. The LTE system is a technology to implement high-speed packet-based communication having a maximum transmission speed of about 100 Mbps with the aim of commercialization in about 2010. For this, there have been discussions on several schemes, for example, a scheme to reduce the number of nodes that are positioned on communication paths through simplification of the structure of a network and a scheme to make radio protocols maximally approach radio channels.

Meanwhile, if User Equipment (UE) performs direct communication with an opposite UE without involving an Evolved Node B (ENB), a relatively small amount of radio resources is used in comparison with a case where the communication is performed using an ENB in the existing radio network; thus, radio resource efficiency is greatly improved.

Further, since a method that can find UEs around the UE is supported, the UE can send directly necessary information to a desired UE; thus, efficiency is greatly heightened in supporting an advertisement service or a Social Networking Service (hereinafter referred to as "SNS").

However, if time synchronization between UEs is not performed during performing of such D2D communication, accurate communication may not be performed, and there is now a need for discussion on this subject.

DISCLOSURE OF INVENTION

Technical Problem

The present invention has been made in order to solve the above problem s, and an aspect of the present invention provides schemes that can match time synchronization between UEs regardless of the positions of the UEs when a radio communication system performs D2D communication in a cellular network (e.g., 4G network, such as LTE).

Solution to Problem

The following schemes are proposed as means for solving the above problems according to the present invention.
  Definition of two sets of synchronization signal for D2D
    Synchronization signal set #1: A set of one or plural signals that is used by UEs inside an ENB area for synchronization between D2D UEs
    Synchronization signal set #2: A set of one or plural signals that is used by UEs outside the ENB area for synchronization between the D2D UEs
  For D2D communication, the UEs in the ENB area transmit one signal of the synchronization signal set #1, and the UEs outside the ENB area transmit one signal of the synchronization signal set #2.
    Whether the UEs are inside the ENB area is determined by the following methods.
  In the case where the UE is in RRC_CONNECTED state
  In the case where the UE is in Camped Normally state or Camped on Any Cell state in RRC_IDLE state
  The UE that is outside a coverage but can receive a UE signal in the coverage receives both the synchronization signal set #1 signal and the synchronization signal set #2 signal.
  The UE performs synchronization with the synchronization signal set #1 signal.
  After the synchronization, the UE transmits the synchronization signal set #1.
  Thereafter, if other UEs outside the ENB area that transmit the synchronization signal set #2 signal also receive the synchronization signal set #1 signal, they transmit the synchronization signal set #1 signal through the above-described procedure to perform synchronization with the synchronization signal set #1.
  More specifically, in one aspect of the present invention, a method for synchronization of UE in a radio communication system that performs D2D communication includes: determining whether a synchronization signal that is transmitted from an Evolved Node B (ENB) is received; if the synchronization signal that is transmitted from the ENB is received, performing synchronization with the ENB; if the synchronization signal that is transmitted from the ENB is not received, determining whether a signal that is included in a first synchronization signal set is received; and if it is determined that the signal that is included in the first synchronization signal set is received, performing synchronization based on the received signal.

In another aspect of the present invention, UE configured to perform D2D communication includes: a transceiver unit transmitting/receiving signals with an Evolved Node B (ENB) or adjacent UE; and a control unit operating to determine whether a synchronization signal that is transmitted from the ENB is received, to perform synchronization with the ENB if the synchronization signal that is transmitted from the ENB is received, to determine whether a signal that is included in a first synchronization signal set is received if the synchronization signal that is transmitted from the ENB is not received, and to perform synchronization based on the received signal if it is determined that the signal that is included in the first synchronization signal set is received.

Advantageous Effects of Invention

Using the proposed method, all the UEs can operate to match the time synchronization without malfunction in accordance with the synchronization signal of the ENB even in a scenario in which the UE inside the ENB area and the UE outside the ENB area coexist.

MODE FOR THE INVENTION

Figure 1:
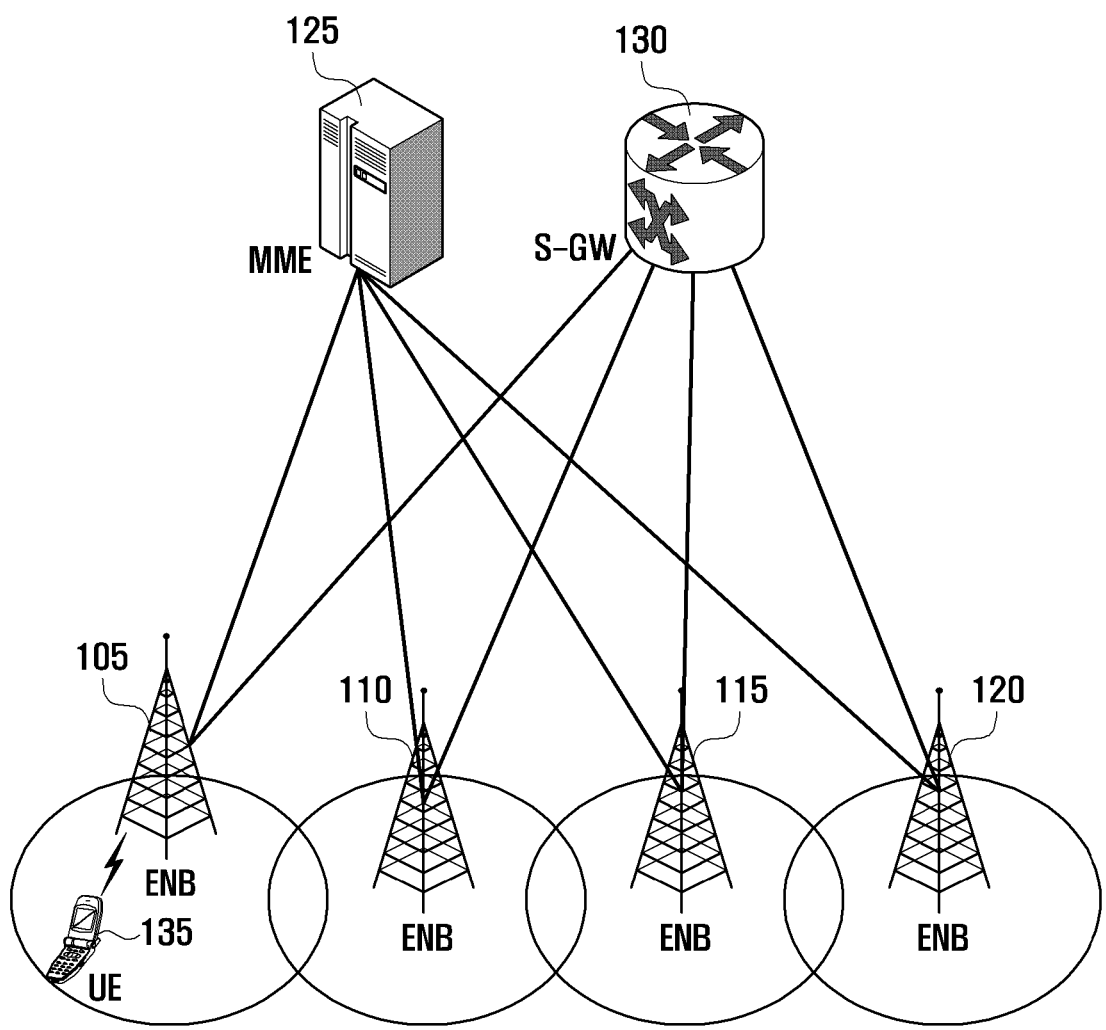
FIG. 1 is a view illustrating the structure of an LTE system to which the present invention is applied.

Hereinafter, preferred embodiments of the present invention will be described in detail with reference to the accompanying drawings. In the accompanying drawings, the same reference numerals are used for the same constituent elements.

Further, detailed descriptions of well-known functions or constructions incorporated herein may be omitted to avoid obscuring the subject matter of the present invention. Hereinafter, embodiments of the present invention will be described with reference to the accompanying drawings.

In the present invention, for convenience in explanation, explanation will be made on the basis of an LTE system as an example of a cellular network. However, it should be noted that the present invention can be applied generally even to other cellular networks (e.g., UMTS).

FIG. 1 is a view illustrating the structure of an LTE system to which the present invention is applied.

Referring to FIG. 1, a radio access network of an LTE system includes Evolved Node Bs (hereinafter referred to as "ENBs", "Node Bs", or "base stations") 105, 110, 115, and 120; a Mobility Management Entity (MME) 125; and a Serving-Gateway (S-GW) 130. User Equipment (hereinafter referred to as "UE" or "terminal") 135 is connected to an external network through the ENBs 105, 110, 115, and 120 and the S-GW 130.

In FIG. 1, the ENBs 105 to 120 correspond to the existing Node Bs of a UMTS system. The ENBs 105, 110, 115, and 120 are connected through a radio channel and perform a more complicated role than the role of the existing Node Bs. Since all user traffic including a real-time service, such as a Voice over IP (VoIP), through the Internet protocol are serviced through a shared channel, it is necessary to have a device that performs scheduling through gathering of status information, such as a buffer status of UE, an available transmission power status, or a channel status; and the ENBs 105, 110, 115, and 120 take charge of this. One of the ENBs 105 to 120 typically controls a plurality of cells. In order to implement a transmission speed of 100 Mbps, the LTE system uses Orthogonal Frequency Division Multiplexing (hereinafter referred to as "OFDM"), for example, in the bandwidth of 20 MHz as a radio connection technology. Further, the ENBs 105 to 120 adopt Adaptive Modulation & Coding (hereinafter referred to as "AMC") that determines a modulation scheme and a channel coding rate to match the channel status of the UE 135. The S-GW 130 is a device that provides a data bearer, and it generates or removes the data bearer in accordance with the control of the MME 125. The MME 125 is a device that takes charge of not only mobility management of the UE 135 but also various kinds of control functions, and it is connected to a plurality of ENBs.

Figure 2:
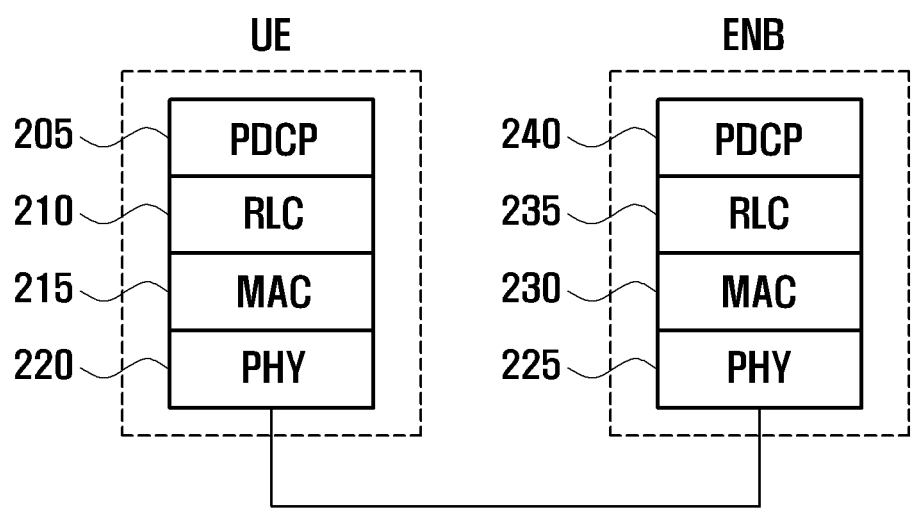
FIG. 2 is a diagram illustrating a radio protocol structure in an LTE system to which the present invention is applied.

FIG. 2 is a diagram illustrating a radio protocol structure in an LTE system to which the present invention is applied.

Referring to FIG. 2, a radio protocol of an LTE system is composed of a Packet Data Convergence Protocol (PDCP) 205 or 240, a Radio Link Control (RLC) 210 or 235, and a Medium Access Control (MAC) 215 or 230 in each of UE and ENB. The Packet Data Convergence Protocol (PDCP) 205 or 240 takes charge of IP header compression/decompression operation, and the Radio Link Control (RLC) 210 or 235 reconfigures a PDCP Packet Data Unit (PDU) with an appropriate size. The MAC 215 or 230 is connected to various RLC layer devices configured in one UE, and it performs multiplexing of RLC PDUs to a MAC PDU and demultiplexing of RLC PDUs from the MAC PDU. A physical layer 220 or 225 performs channel coding and modulation of upper layer data and produces an OFDM symbol to transmit the OFDM symbol to a radio channel, or it performs demodulation and channel decoding of an OFDM symbol that is received through the radio channel to transfer the demodulated and decoded OFDM symbol to an upper layer. Further, Hybrid ARQ (HARQ) is used to perform additional error correction even in the physical layer, and a receiving end transmits whether a packet that is transmitted from a transmitting end is received by one bit. This is called HARQ ACK/NACK information. Downlink HARQ ACK/NACK information for uplink transmission may be transmitted through a Physical Hybrid-ARQ Indicator Channel (PUICH) physical channel, and uplink HARQ ACK/NACK information for downlink transmission may be transmitted through a Physical Uplink Control Channel (PUCCH) or Physical Uplink Shared Channel (PUSCH) physical channel.

At present, with the spread of smart phones, users' data usage rates have increased suddenly; and, in order to cope with the sudden increase in data, mobile communication network service providers have installed the above newest LTE system to provide data services to subscribers. However, since the data transmission demand is still increasing, there is a need for the development of new technology. Accordingly, the 3GPP standardization group has struggled to define technology that will perform communication between UEs without involving the ENB.

In order to perform communication between UEs, it is necessary to match time synchronization between UEs. Various schemes for matching the time synchronization have been proposed.

For example, in a general mobile communication cellular system or a wireless LAN system that operates in infrastructure mode (mode in which communication is performed using an Access Point (AP)), the ENB or wireless LAN AP transmits a reference signal to match the time synchronization between the UEs in the ENB or wireless LAN AP.

As an additional example, in a wireless LAN system that operates in ad-hoc mode (mode in which communication is performed between UEs without the AP), all the UEs that perform communication at a determined time attempt to transmit a reference signal (beacon frame). If one UE succeeds in transmission of the reference signal, the remaining UEs cancel the reference signal transmission and match the time synchronization in accordance with the received reference signal.

Figure 3:
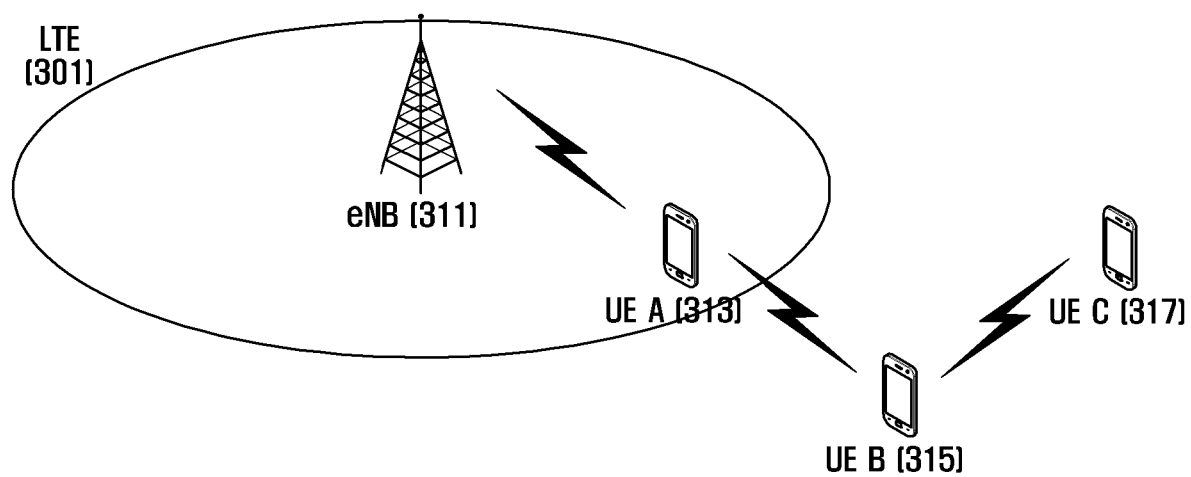
FIG. 3 is a view exemplifying a scenario that is considered in the present invention.

FIG. 3 is a view exemplifying a scenario that is considered in the present invention.

Referring to FIG. 3, a next scenario is assumed. Like terminal A (or UE) 313, some UEs may be positioned in the ENB area (or coverage) and can match synchronization with the ENB. Further, like UE B 315, some UEs may not be positioned in the ENB area, but they can communicate with the UEs that are positioned in the ENB area and can match the synchronization with the ENB. Further, like UE C 317, some UEs may be unable to communicate with the UEs that are positioned in the ENB area and can match the synchronization with the ENB.

In the case of applying the schemes in the related art in the above-described scenario, that is, in the case of matching the synchronization using a scheme for matching the time synchronization between the UEs in the ENB with reference to the reference signal that is transmitted from the ENB and a separate scheme between the UEs outside the ENB area, new schemes for time synchronization are required that are applicable even in the case where various types of UEs coexist.

In an embodiment of the present invention to be described hereinafter, in the case of performing D2D communication, a method is proposed that can match the time synchronization between the UEs regardless of the positions of the UEs.

Figure 4:
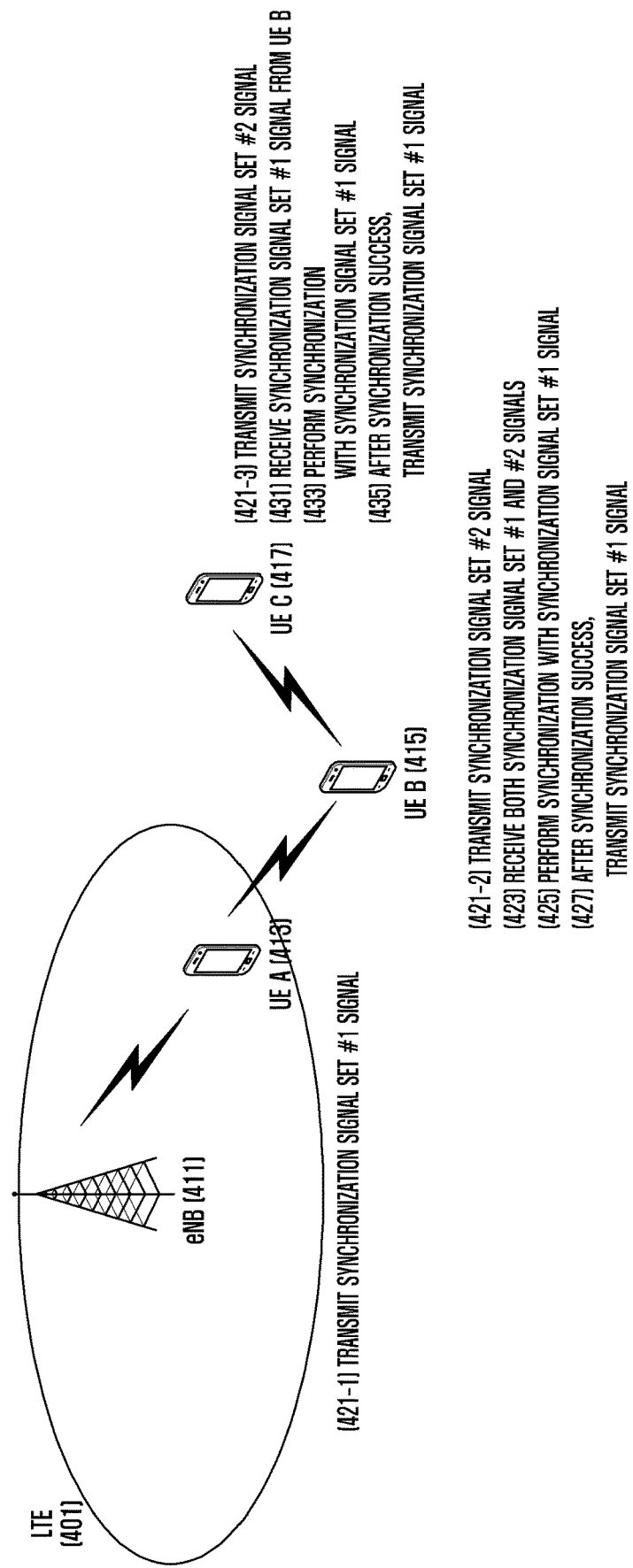
FIG. 4 is a view explaining an operation scenario to which schemes proposed in the present invention are applied.

FIG. 4 is a view explaining an operation scenario to which schemes proposed in the present invention are applied.

In FIG. 4, like UE A 413, some UEs are positioned in the ENB area and can match synchronization with the ENB. Further, like UE B 415, some UEs are not positioned in the ENB area, but they can communicate with the UEs that are positioned in the ENB area and can match the synchronization with the ENB. Further, like UE C 417, some UEs are unable to communicate with the UEs that are positioned in the ENB area and can match the synchronization with the ENB.

In the above scenario, according to an embodiment of the present invention, it is first proposed to divide a time synchronization signal for D2D communication into two kinds of sets as follows.

Synchronization signal set #1 (or first synchronization signal set): A set of one or plural signals that is used by UEs inside an ENB area for synchronization between D2D UEs Synchronization signal set #2 (or second synchronization signal set): A set of one or plural signals that is used by UEs outside the ENB area for synchronization between the D2D UEs The above synchronization signal sets may be physical signals specially designed for the synchronization between devices or they may be upper-layer messages including message division information. Examples of the physical signals may be signals similar to a Primary Synchronization Signal (hereinafter referred to as "PSS") and a Secondary Synchronization Signal (hereinafter referred to as "SSS"). Further, examples of the upper-layer messages may be messages similar to beacon messages used for the synchronization in the wireless LAN system. In addition, the synchronization signal sets may conceptually include all signals of different types that can be used for the synchronization between devices.

Thereafter, each of the respective UEs determines whether it is positioned in the current ENB area. As a method for determining the position in the ENB area, the UE may determine its position depending on whether a synchronization signal (e.g., above-described PSS or SSS) that is transmitted from the ENB is received regardless of the current UE state (RRC_CONNECTED state or RRC_IDLE state) or existence/nonexistence of a serving cell (If it is possible to receive a necessary channel for acquiring timing synchronization from the ENB, the UE may determine that it is positioned in the ENB area. An example of the necessary channel for acquiring the timing synchronization may be a Primary-Broadcast Channel (P-BCH) for transmitting the primary synchronization signal and/or the secondary synchronization signal and/or System Frame Number (SFN) system information. The system frame number information indicates the order/index of each radio frame). Further, a method for determination in accordance with the operating state of the UE may be used. That is, when the UE is in the following operating states, the UE determines that it is positioned in the ENB area.

In the case where the UE is in RRC_CONNECTED state (RRC connected state)

When the UE is set to be connected to the ENB and a Radio Resource Control (RRC) layer, the UE is in the RRC_CONNECTED state.

In the RRC_CONNECTED state, the UE can perform data transmission/reception by unicast through the ENB.

In the case where the UE is in Camped Normally state (general camped state) or Camped on Any Cell state (camped state on any cell) in RRC_IDLE state In the case where the UE is not set to be connected to the ENB and the RRC layer, but it has found a suitable cell for connection, the UE is in a state where the UE stays in the corresponding cell for a normal service, which is called the Camped Normally state.

In the case where the UE is not set to be connected to the ENB and the RRC layer and has not found a suitable cell for connection, but it has found an acceptable cell, the UE is in a state where the UE stays in the corresponding cell for an emergency service, which is called the Camped on Any Cell state.

According to an embodiment of the present invention, in the case where the UE is in one of the above-described states (i.e., the RRC connection state, the Camped Normally state in the RRC_IDLE state, and the Camped on Any Cell state in the RRC_IDLE state), the UE determines that it is positioned in the ENB area.

If the UE determines that it is in the ENB area as the result of the determination, the UE selects and transmits a certain signal that is selected from the synchronization signal set #1 (421-1). In this case, the UE may select the certain signal from the synchronization signal set #1 in accordance with a predetermined rule (e.g., predetermined hash function), or it may randomly select the certain signal from the synchronization signal set #1.

In contrast, if the UE determines that it is outside the ENB area as the result of the determination, the UE selects and transmits a certain signal that is selected from the synchronization signal set #2 (421-2) (421-3). In this case, the UE may select the certain signal from the synchronization signal set #2 in accordance with the predetermined rule (e.g., predetermined hash function), or it may randomly select the certain signal from the synchronization signal set #2.

On the other hand, if the UE determines that it is in the ENB area in a state where a separate D2D dedicated channel is provided for transmitting the system frame number for the D2D communication, the UE (UE A in the drawing) may transmit the system frame number value to the separate D2D dedicated channel to match the system frame number value that is received from the ENB. Further, the UE scrambles the system frame number value that is transmitted to the separate D2D dedicated channel with one signal selected from the synchronization signal set #1 to transmit the scrambled signal. As the signal for scrambling, a Walsh code or other kinds of scrambling codes may be used.

If the signal is transmitted and received through the above-described method, the UEs that exist outside the ENB area but can receive signals transmitted from the UEs in the ENB receive both the synchronization signal set #1 signal and the synchronization signal set #2 signal (423).

The UE (UE B 415) preferentially performs synchronization with the synchronization signal set #1 (425).

After completing the synchronization with the synchronization signal set #1 signal, the UE B 415 transmits one signal selected from the synchronization signal set #1 in accordance with the matched time synchronization (427). The synchronization signal set #1 signal that is transmitted by the UE B may be the same as the signal that is transmitted by the UE A 413 or may be another signal selected from the synchronization signal set #1.

On the other hand, if the UE receives both the synchronization signal set #1 signal and the synchronization signal set #2 signal in a state where a separate D2D dedicated channel is provided for transmitting the system frame number for the D2D communication, the UE B may transmit the system frame number value to the separate D2D dedicated channel to match the system frame number value that is received from the UE A through the separate D2D dedicated channel. Further, the UE B scrambles the system frame number value that is transmitted to the separate D2D dedicated channel with one signal selected from the synchronization signal set #1 to transmit the scrambled signal. As the signal for scrambling, a Walsh code or other kinds of scrambling codes may be used.

Thereafter, the UE B 415 starts transmission of one signal selected from the synchronization signal set #1; thus, the UE C 417 receives the synchronization signal set #1 signal from the UE B (431). The UE C that has received this preferentially performs synchronization with the received synchronization signal set #1 (433).

After completing the synchronization with the synchronization signal set #1 signal, the UE C 417 transmits one signal selected from the synchronization signal set #1 in accordance with the matched time synchronization (435). The synchronization signal set #1 signal that is transmitted by the UE C may be the same as the signal that is transmitted by the UE B or may be another signal selected from the synchronization signal set #1.

On the other hand, if the UE receives both the synchronization signal set #1 signal and the synchronization signal set #2 signal in a state where a separate D2D dedicated channel is provided for transmitting the system frame number for the D2D communication, the UE C may transmit the system frame number value to the separate D2D dedicated channel to match the system frame number value that is received from the UE B through the separate D2D dedicated channel. Further, the UE C scrambles the system frame number value that is transmitted to the separate D2D dedicated channel with one signal selected from the synchronization signal set #1 to transmit the scrambled signal. As the signal for scrambling, a Walsh code or other kinds of scrambling codes may be used.

Through the above-described method, both the UE B and the UE C, which are not in the ENB area, may perform the synchronization with the UEs that are in the ENB and, thereafter, may perform communication between UEs.

Figure 5:
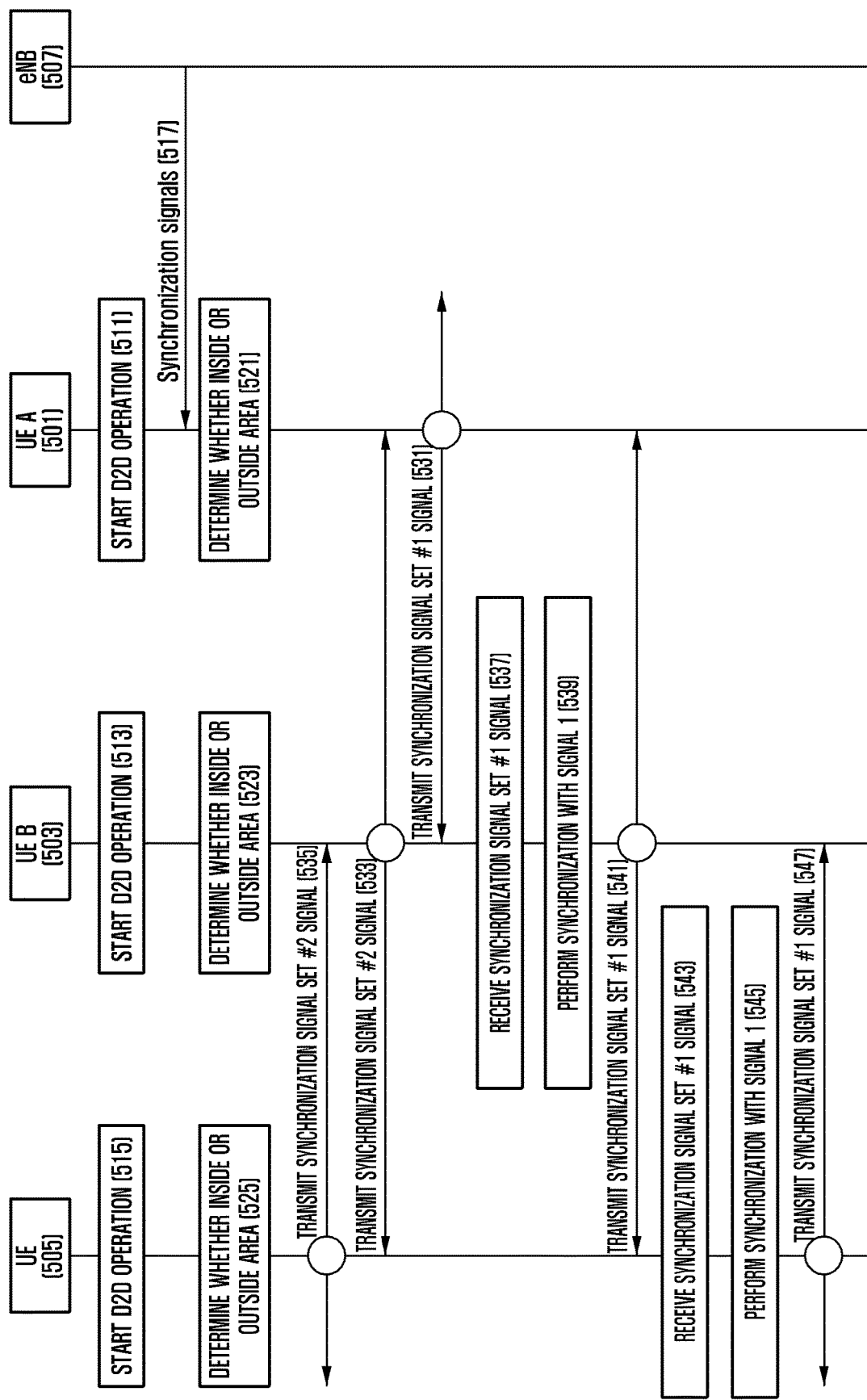
FIG. 5 is a diagram explaining message order when schemes proposed in the present invention are applied.

FIG. 5 is a diagram explaining message transmission/reception order when schemes proposed in the present invention are applied.

For convenience in explanation, it is assumed that the UE A 413 of FIG. 4 corresponds to UE A 501 of FIG. 5, the UE B 415 of FIG. 4 corresponds to UE B 503 of FIG. 5, and the UE C 417 of FIG. 4 corresponds to UE C 505 of FIG. 5.

In FIG. 5, UBs 501, 503, and 505 determine to start D2D communication (511, 513, and 515). The above-described determination may start when a user presses a D2D dedicated button in the UE or may start when the user executes a D2D application in the UE. However, the present invention is not essentially limited to the above-described embodiments. On the other hand, according to another embodiment, during the start, the UE may start a predetermined timer that is used to determine whether to abandon the synchronization with the synchronization signal set #1 hereinafter.

Thereafter, each of the respective UEs determines whether it is positioned in the current ENB area (521), (523), and (525). As a method for determining the position in the ENB area, the UE may determine its position depending on whether a synchronization signal (517) that is transmitted from the ENB is received regardless of the current UE state (RRC_CONNECTED state or RRC_IDLE state) or existence/nonexistence of a serving cell (If it is possible to receive a necessary channel for acquiring timing synchronization from the ENB, the UE may determine that it is positioned in the ENB area. An example of the necessary channel for acquiring the timing synchronization may be a Primary-Broadcast Channel (P-BCH) for transmitting the primary synchronization signal and/or the secondary synchronization signal and/or System Frame Number (SFN) system information. The system frame number information indicates the order/index of each radio frame). Further, a method for determination in accordance with the operating state of the UE may be used. That is, when the UE is in the following operating states, the UE determines that it is positioned in the ENB area.

In the case where the UE is in RRC_CONNECTED state (RRC connection state)

When the UE is set to be connected to the RRC layer, the UE is in the RRC_CONNECTED state.

In the RRC_CONNECTED state, the UE can perform data transmission/reception by unicast through the ENB.

In the case where the UE is in Camped Normally state (general camped state) or Camped on Any Cell state (camped state on any cell) in RRC_IDLE state In the case where the UE is not set to be connected to the ENB and the RRC layer, but it has found a suitable cell for connection, the UE is in a state where the UE stays in the corresponding cell for a normal service, which is called the Camped Normally state.

In the case where the UE is not set to be connected to the ENB and the RRC layer and has not found a suitable cell for connection, but it has found an acceptable cell, the UE is in a state where the UE stays in the corresponding cell for an emergency service, which is called the Camped on Any Cell state.

In the case where the UE is in one of the above-described states, the UE determines that it is positioned in the ENB area.

If the UE determines that it is in the ENB area as the result of the determination, the UE selects and transmits a certain signal that is selected from the synchronization signal set #1 as described above with reference to FIG. 4 (531).

If the UE determines that it is outside the ENB area as the result of the determination, the UE selects and transmits a certain signal that is selected from the synchronization signal set #2 as described above with reference to FIG. 4 (533) (535).

On the other hand, if the UE determines that it is in the ENB area in a state where a separate D2D dedicated channel is provided for transmitting the system frame number for the D2D communication, the UE (UE A in the drawing) may transmit the system frame number value to the separate D2D dedicated channel to match the system frame number value that is received from the ENB. Further, the UE scrambles the system frame number value that is transmitted to the separate D2D dedicated channel with one signal selected from the synchronization signal set #1 to transmit the scrambled signal (531). As the signal for scrambling, a Walsh code or other kinds of scrambling codes may be used.

Thereafter, if the UE B 503 that determines that it is outside the ENB area and transmits a certain signal that is selected from the synchronization signal set #2 receives the synchronization signal set #1 signal during the above-described operation (537), the UE B 503 preferentially performs synchronization with the synchronization signal set #1 (539).

After completing the synchronization with the synchronization signal set #1 signal, the UE B 503 transmits one signal selected from the synchronization signal set #1 in accordance with the matched time synchronization (541). The synchronization signal set #1 signal that is transmitted by the UE B may be the same as the signal that is transmitted by the UE A 501 or may be another signal selected from the synchronization signal set #1.

On the other hand, if the UE receives both the synchronization signal set #1 signal and the synchronization signal set #2 signal in a state where a separate D2D dedicated channel is provided for transmitting the system frame number for the D2D communication, the UE B may transmit the system frame number value to the separate D2D dedicated channel to match the system frame number value that is received from the UE A through the separate D2D dedicated channel. Further, the UE B scrambles the system frame number value that is transmitted to the separate D2D dedicated channel with one signal selected from the synchronization signal set #1 to transmit the scrambled signal (541). As the signal for scrambling, a Walsh code or other kinds of scrambling codes may be used.

Thereafter, the UE B starts transmission of one signal selected from the synchronization signal set #1; thus, the UE C 505 receives the synchronization signal set #1 signal from the UE B (543). The UE C that has received this preferentially performs synchronization with the received synchronization signal set #1 (545).

After completing the synchronization with the synchronization signal set #1 signal, the UE C transmits one signal selected from the synchronization signal set #1 in accordance with the matched time synchronization (547). The synchronization signal set #1 signal that is transmitted by the UE C may be the same as the signal that is transmitted by the UE B or may be another signal selected from the synchronization signal set #1.

On the other hand, if the UE receives both the synchronization signal set #1 signal and the synchronization signal set #2 signal in a state where a separate D2D dedicated channel is provided for transmitting the system frame number for the D2D communication, the UE C may transmit the system frame number value to the separate D2D dedicated channel to match the system frame number value that is received from the UE B through the separate D2D dedicated channel. Further, the UE C scrambles the system frame number value that is transmitted to the separate D2D dedicated channel with one signal selected from the synchronization signal set #1 to transmit the scrambled signal (547). As the signal for scrambling, a Walsh code or other kinds of scrambling codes may be used.

Through the above-described method, both the UE B and the UE C, which are not in the ENB area, may perform the synchronization with the UEs that are in the ENB and perform communication between UEs.

Figure 6:
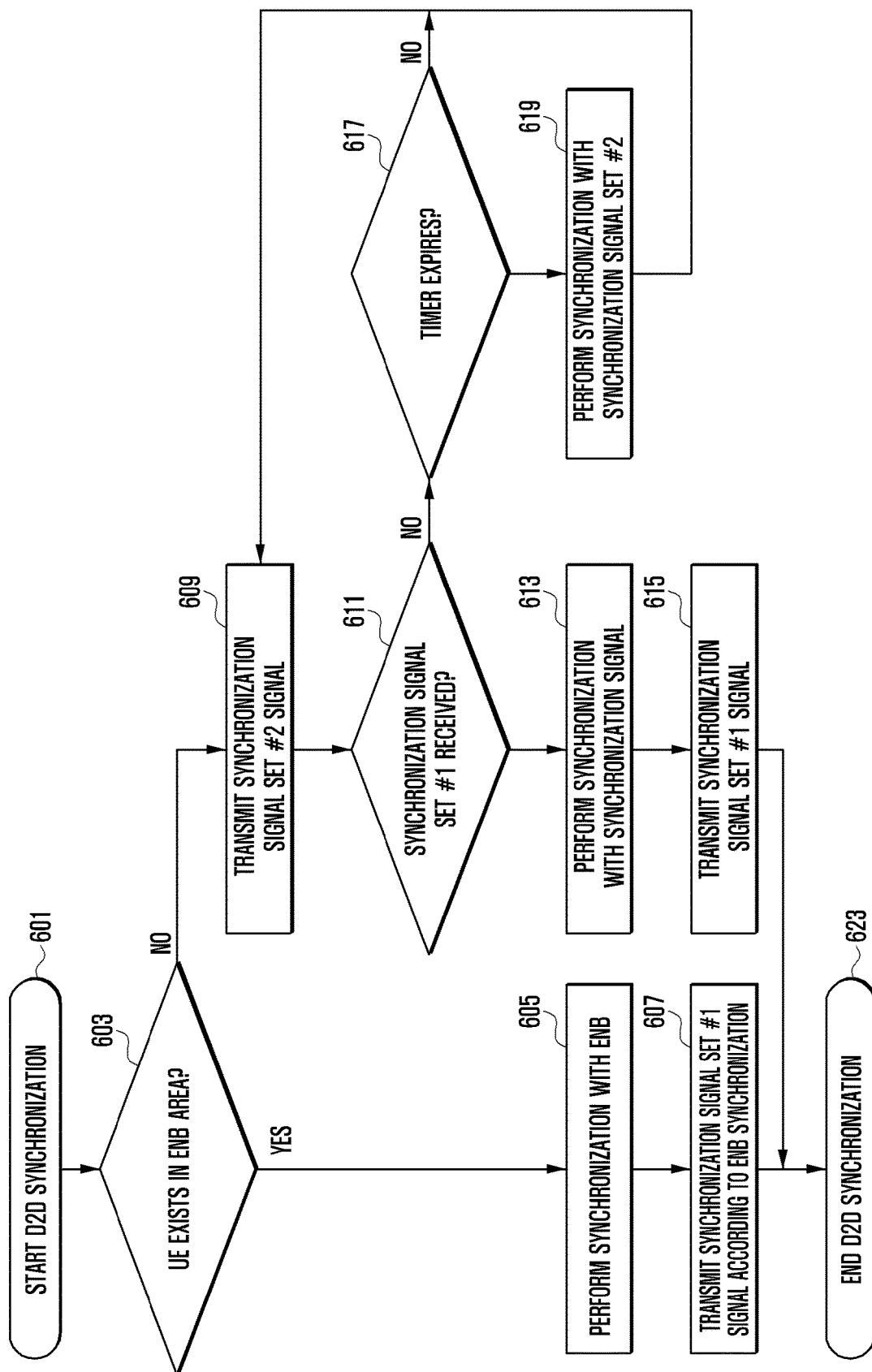
FIG. 6 is a diagram explaining the UE operation order when schemes proposed in the present invention are applied.

FIG. 6 is a diagram explaining the UE operation order when schemes proposed in the present invention are applied.

In FIG. 6, the UE determines to start D2D communication (601). The above-described determination may start when a user presses a D2D dedicated button in the UE or may start when the user executes a D2D application in the UE. During the start, the UE may start a predetermined timer that is used to determine whether to abandon the synchronization with the synchronization signal set #1 hereinafter.

Thereafter, each of the respective UEs determines whether it is positioned in the current ENB area (603). As a method for determining the position in the ENB area, the UE may determine its position depending on whether a synchronization signal that is transmitted from the ENB is received or a method for determination in accordance with the operating state of the UE may be used. In the case of the determination in accordance with the operating state of the UE, the UE determines that it is positioned in the ENB area when the UE is in the following operating states.

In the case where the UE is in RRC_CONNECTED state (RRC connection state)

When the UE is set to be connected to the RRC layer, the UE is in the RRC_CONNECTED state.

In the RRC_CONNECTED state, the UE can perform data transmission/reception by unicast through the ENB.

In the case where the UE is in Camped Normally state (general camped state) or Camped on Any Cell state (camped state on any cell) in RRC_IDLE state In the case where the UE is not set to be connected to the ENB and the RRC layer, but it has found a suitable cell for connection, the UE is in a state where the UE stays in the corresponding cell for a normal service, which is called the Camped Normally state.

In the case where the UE is not set to be connected to the ENB and the RRC layer and has not found a suitable cell for connection, but it has found an acceptable cell, the UE is in a state where the UE stays in the corresponding cell for an emergency service, which is called the Camped on Any Cell state.

In the case where the UE is in one of the above-described states, the UE determines that it is positioned in the ENB area.

If the UE determines that it is in the ENB area as the result of the determination, the UE performs synchronization with the ENB (605). If the synchronization has already been performed between the UE and the ENB, this process may be omitted. Thereafter, if the synchronization with the ENB is completed, the UE selects and transmits a certain signal that is selected from the synchronization signal set #1 as described above with reference to FIG. 4 in accordance with the synchronization that matches the ENB (607). On the other hand, if the UE determines that it is in the ENB area in a state where a separate D2D dedicated channel is provided for transmitting the system frame number for the D2D communication, the UE may transmit the system frame number value to the separate D2D dedicated channel to match the system frame number value that is received from the ENB and may scramble the system frame number value with one signal selected from the synchronization signal set #1 to transmit the scrambled signal. As the signal for scrambling, a Walsh code or other kinds of scrambling codes may be used.

On the other hand, if the UE determines that it is outside the ENB area as the result of the determination (603), the UE selects and transmits a certain signal that is selected from the synchronization signal set #2 as described above with reference to FIG. 4 (609).

Thereafter, a case where the synchronization signal set #1 signal is received during the operation is determined (611). If the synchronization signal set #1 signal is received as the result of the determination, the UE preferentially performs synchronization with the synchronization signal set #1 signal (613).

After completing the synchronization with the synchronization signal set #1 signal, the UE starts transmission of one signal selected from the synchronization signal set #1 in accordance with the matched time synchronization (615). The synchronization signal set #1 signal may be the same as the signal that is received by the UE at operation 611, or it may be another signal selected from the synchronization signal set #1. Further, if the UE receives both the synchronization signal set #1 signal and the synchronization signal set #2 signal as described above in a state where a separate D2D dedicated channel is provided for transmitting the system frame number for the D2D communication, the UE may transmit the system frame number value to the separate D2D dedicated channel to match the system frame number value that is received from another UE through the separate D2D dedicated channel. Further, the UE scrambles the system frame number value that is transmitted to the separate D2D dedicated channel with one signal selected from the synchronization signal set #1 to transmit the scrambled signal. As the signal for scrambling, a Walsh code or other kinds of scrambling codes may be used.

On the other hand, if the synchronization signal set #1 signal is not received at operation 611, the UE additionally determines whether the predetermined timer that has started the operation at operation 601 has expired or whether the number of times of transmission of the synchronization signal set #2 signal at operation 609 exceeds a predetermined threshold value (617).

If the timer has not expired or the number of times of transmission does not exceed the threshold value, the UE repeatedly performs the transmission of the synchronization signal set #2 signal (609).

However, if the timer has expired or the number of times of transmission exceeds the threshold value, the UE preferentially performs the mutual time synchronization based on the synchronization signal set #2 signal that is transmitted by other surrounding UEs (619), transmits the synchronization signal set #2 signal that matches the mutual time synchronization (609), and then determines a case where the synchronization signal set #1 signal is received during the operation (611).

Through the above-described method, both the UE B and the UE C, which are not in the ENB area, may perform the synchronization with the UEs that are in the ENB and perform communication between the UEs.

Figure 7:
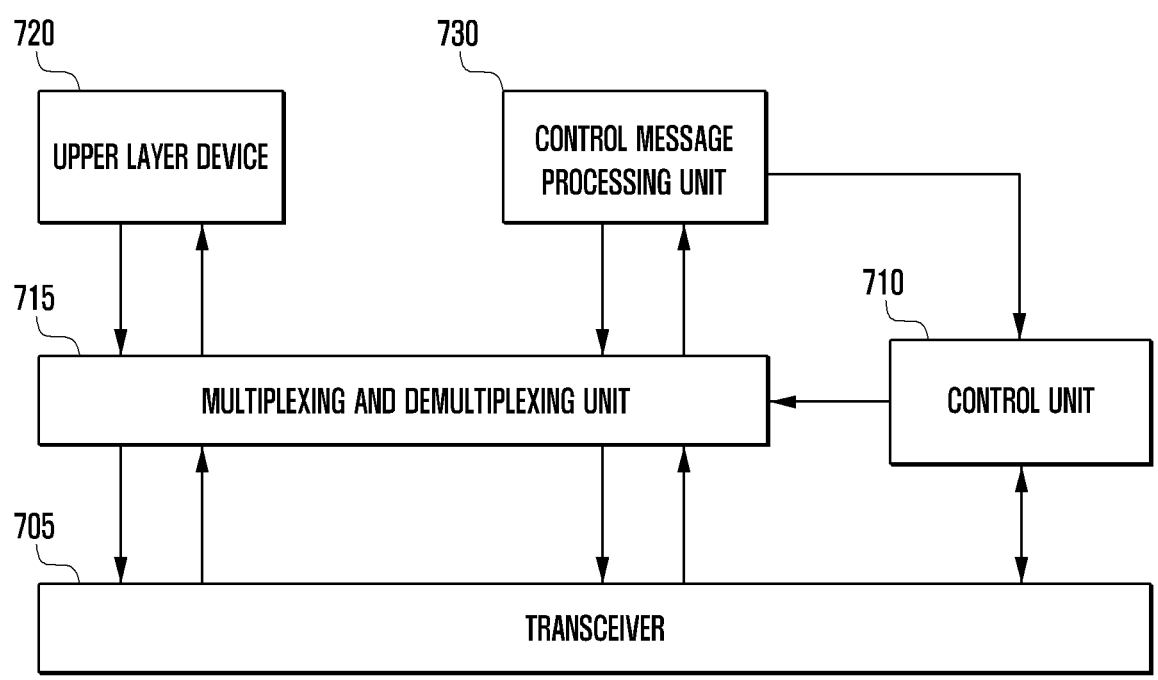
FIG. 7 is a diagram illustrating the configuration of UE according to an embodiment of the present invention.

FIG. 7 is a diagram illustrating the configuration of UE according to an embodiment of the present invention.

Referring to FIG. 7, the UE according to an embodiment of the present invention includes a transceiver unit 705, a control unit 710, a multiplexing and demultiplexing unit 715, a control message processing unit 730, and an upper layer processing unit 720.

The transceiver unit 705 receives data and a predetermined control signal through a forward channel of a serving cell and transmits data and a predetermine control signal through a reverse channel. Further, in the case of performing D2D communication, transmission/reception of a synchronization signal and a D2D dedicated channel proposed in the present invention is performed.

The multiplexing and demultiplexing unit 715 serves to multiplex data that is generated in the upper layer processing unit 720 or the control message processing unit 730 or to demultiplex data that is received from the transceiver unit 705, and to transfer the processed data to the upper layer processing unit 720 or the control message processing unit 730. For example, in the case where a D2D dedicated channel that is proposed in the present invention exists, the multiplexing and demultiplexing unit 715 serves to transfer the system frame number received through the D2D dedicated channel to the control message processing unit 730.

The control message processing unit undertakes any necessary operation through processing of a control message that is received from the ENB.

The upper layer processing unit 720 may be configured by services. The upper layer processing unit 720 processes data that is generated in a user service, such as File Transfer Protocol (FTP) or Voice over Internet Protocol (VoIP), to transfer the processed data to the multiplexing and demultiplexing unit 715 or processes data that is transferred from the multiplexing and demultiplexing unit 715 to transfer the processed data to an upper layer service application.

The control unit 710 controls the transceiver unit 705 and the multiplexing and demultiplexing unit 715 to perform reverse transmission with proper transmission resources at a proper time through confirmation of a scheduling command that is received through the transceiver unit 705, for example, reverse resource allocation. Further, in the case of performing the D2D communication, the control unit 710 controls transmission/reception of the synchronization signal and the D2D dedicated channel proposed in the present invention.

In particular, the control unit 710 according to an embodiment of the present invention may determine whether the synchronization signal that is transmitted from the ENB is received. Further, the control unit 710 performs synchronization with the ENB if the synchronization signal that is transmitted from the ENB is received and determines whether a signal that is included in a first synchronization signal set is received if the synchronization signal that is transmitted from the ENB is not received. Further, the control unit performs synchronization based on the received signal if it is determined that the signal that is included in the first synchronization signal set is received.

Further, the control unit 710 may operate to perform the synchronization based on at least one signal that is included in a second synchronization signal set that is transmitted from adjacent UEs if it is determined that the signal that is included in the first synchronization signal set is not received. Here, the signal that is included in the first synchronization signal set may be a signal that is transmitted by the UE that is positioned in a service area of the ENB, and the signal that is included in the second synchronization signal set may be a signal that is transmitted by the UE that is not positioned in the service area of the ENB. Further, if the synchronization signal that is transmitted from the ENB is received, the control unit performs synchronization based on the received signal and then selects and transmits a certain signal that is selected from at least one signal included in the first synchronization signal set. Further, if the synchronization signal that is transmitted from the ENB is not received, the control unit selects and transmits a certain signal that is selected from at least one signal included in the second synchronization signal set.

Further, if the signal included in the first synchronization signal set is not received until the pre-driven timer expires in a state where the UE is not positioned in the service area of the ENB, the control unit 710 may perform synchronization based on at least one signal included in the second synchronization signal set transmitted from the adjacent UE.

Using the proposed method, all the UEs can operate to match the time synchronization without malfunction in accordance with the synchronization signal of the ENB even if the UE inside the ENB area and the UE outside the ENB area coexist.

Meanwhile, preferred embodiments of the present invention disclosed in this specification and drawings and specific terms used therein are illustrated to present only specific examples in order to clarify the technical contents of the present invention and help understanding of the present invention, and they are not intended to limit the scope of the present invention. It will be evident to those skilled in the art that various implementations based on the technical spirit of the present invention are possible in addition to the disclosed embodiments.

The invention claimed is:

1. A method performed by a first user equipment (UE) in a wireless communication system, the method comprising:
   determining whether the first UE is in a coverage of a base station;
   in case that the first UE is out of the coverage of the base station:
      receiving, from a second UE, a synchronization signal, wherein, in case that the second UE is in the coverage of the base station, the received synchronization signal is from a first synchronization signal set, and
      wherein, in case that the second UE is out of the coverage of the base station, the received synchronization signal is from a second synchronization signal set;
   performing synchronization with the received synchronization signal; and
   transmitting, to another UE, a synchronization signal from the first synchronization signal set, in case that the received synchronization signal is from the first synchronization signal set.

2. The method of claim 1, wherein determining whether the first UE is in the coverage of the base station comprises:
   in case that the first UE is out of the coverage of the base station, transmitting a synchronization signal that is randomly selected from the second synchronization signal set.

3. The method of claim 1, wherein, in case that the first UE is in one of a radio resource control (RRC) connected state, a camped normally state in an RRC idle state, or a camped on any cell state in the RRC idle state, the first UE is in the coverage of the base station.

4. The method of claim 1, wherein determining whether the first UE is in the coverage of the base station further comprises, in case that a synchronization signal transmitted from the base station is received, performing synchronization with the base station.

5. The method of claim 1, wherein determining whether the first UE is in the coverage of the base station further comprises determining whether a synchronization signal transmitted from the base station is received.

6. The method of claim 1, wherein the first synchronization signal set is defined for in the coverage of the base station, and
   wherein the second synchronization signal set is defined for out of the coverage of the base station.

7. A first user equipment (UE) in a wireless communication system, the first UE comprising:
   a transceiver; and
   a controller configured to:
      determine whether the first UE is in a coverage of a base station,
      in case that the first UE is out of the coverage of the base station:
         receive, from a second UE, a synchronization signal, wherein, in case that the second UE is in the coverage of the base station, the received synchronization signal is from a first synchronization signal set, and
         wherein, in case that the second UE is out of the coverage of the base station, the received synchronization signal is from a second synchronization signal set,
      perform synchronization with the received synchronization signal, and
      transmit, to another UE, a synchronization signal from the first synchronization signal set, in case that the received synchronization signal is from the first synchronization signal set.

8. The first UE of claim 7, wherein the controller is further configured to:
   in case that the first UE is out of the coverage of the base station, transmit a synchronization signal that is randomly selected from the second synchronization signal set.

9. The first UE of claim 7, wherein, in case that the first UE is in one of a radio resource control (RRC) connected state, a camped normally state in an RRC idle state, or a camped on any cell state in the RRC idle state, the first UE is in the coverage of the base station.

10. The first UE of claim 7, wherein the controller is further configured to perform synchronization with the base station in case that a synchronization signal transmitted from the base station is received.

11. The first UE of claim 7, wherein the controller is further configured to determine whether a synchronization signal transmitted from the base station is received.

12. The first UE of claim 7, wherein the first synchronization signal set is defined for in the coverage of the base station, and
wherein the second synchronization signal set is defined for out of the coverage of the base station.

\* \* \* \* \*